United States Patent
Campbell et al.

(10) Patent No.: US 7,538,130 B2
(45) Date of Patent: May 26, 2009

(54) HINDERED AMINE LIGHT STABILIZER, METHODS OF MAKING, AND COMPOSITIONS

(75) Inventors: Donald H. Campbell, Hartland, MI (US); Donald L. St. Aubin, Commerce Township, MI (US); Walter H. Ohrbom, Hartland Township, MI (US); John E. Boisseau, Bloomfield Hills, MI (US)

(73) Assignee: BASF Corporation, Wyandotte, MI (US)

( * ) Notice: Subject to any disclaimer, the term of this patent is extended or adjusted under 35 U.S.C. 154(b) by 443 days.

(21) Appl. No.: 11/234,898

(22) Filed: Sep. 26, 2005

(65) Prior Publication Data

US 2007/0072964 A1    Mar. 29, 2007

(51) Int. Cl.
*A61K 31/421* (2006.01)
*A61K 31/5375* (2006.01)
*C07D 263/04* (2006.01)
*C07D 265/04* (2006.01)

(52) U.S. Cl. .............. 514/374; 544/106; 544/158; 548/215; 548/216; 514/231.2

(58) Field of Classification Search ............... 544/106, 544/158; 548/215, 216; 514/231.2, 374
See application file for complete search history.

(56) References Cited

U.S. PATENT DOCUMENTS

| | | | |
|---|---|---|---|
| 5,112,890 A | | 5/1992 | Behrens et al. |
| 5,462,946 A | * | 10/1995 | Mitchell et al. ............ 514/315 |
| 6,117,995 A | | 9/2000 | Zedda et al. |
| 6,342,647 B1 | | 1/2002 | Roof et al. |
| 6,538,141 B1 | | 3/2003 | Gillet et al. |
| 6,605,619 B1 | * | 8/2003 | Mitchell et al. ............ 514/315 |

FOREIGN PATENT DOCUMENTS

| FR | 2219164 A1 | 9/1974 |
|---|---|---|
| WO | 0014177 A | 3/2000 |

OTHER PUBLICATIONS

Mitchell et al (1989): STN International HCAPLUS database, Columbus (OH), accession No.: 2003: 622566.*

Braslau et al (2004): STN International HCAPLUS database, Columbus (OH), accession No.: 2004: 449844.*

The International Search Report for PCT/US2006/031564, Filed Oct. 8, 2006 Including the Written Opinion of the International Searching Authority.

Rebecca Braslau, "Novel Methodology for the Synthesis on N-Alkoxyamines" Organic Letters, 6(13), 2233-2235 Coden: Orlef7; ISSN: 1523-7060, 2004, XP002410271 Table 1; Compounds 15, 16.

Marque Sylvain: "Influence of the Nitroxide Structure on the Homolysis Rate Constant of Alkoxyamines: A Taft-Ingold Analysis" Journal of Organic Chemistry, 68(20), 7582-7590 Coden: Joceah; ISSN: 0022-3263, vol. 68, 2003, p. 7582, XP002410272 Table 2: Compounds 31, 32.

Database WPI Week 199427 Derwent Publications LTD,, London, GB; AN 1994-223126, XP002410282 & JP 06 161023 A (Mitsubishi Kasei Corp) Jun. 1, 1994 Abstrach; compound IV.

* cited by examiner

*Primary Examiner*—Golam M Shameem
(74) *Attorney, Agent, or Firm*—Harness, Dickey & Pierce, P.L.C.

(57) ABSTRACT

A compound

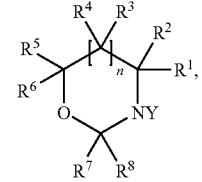

in which n is 0, 1, 2, or 3; $R^1$, $R^2$, $R^7$, and $R^8$ are each independently alkyl group, including cycloalkyl, an alkylaryl group, or an aryl group, optionally with one or more heteroatoms, with the proviso that $R^1$ and $R^2$ can together form a cycloalkylene group and, independently, $R^7$ and $R^8$ can together form a cycloalkylene group; Y is an oxygen free radical, a sulfur free radical, $OR^9$ or $SR^9$; $R^3$, $R^4$, $R^5$, $R^6$, and $R^9$ are each independently H or an alkyl group, a cycloalkyl group, an aryl group, or an alkylaryl group, optionally with one or more heteroatoms; and compositions, such as basecoat and clearcoat coating compositions, containing such compounds.

10 Claims, No Drawings

US 7,538,130 B2

HINDERED AMINE LIGHT STABILIZER, METHODS OF MAKING, AND COMPOSITIONS

FIELD OF THE INVENTION

The invention relates to light stabilizers and compositions containing light stabilizers, particularly coatings.

BACKGROUND OF THE INVENTION

Hindered amine light stabilizers (HALS) are added to compositions to stabilize the compositions against the effects of oxygen and light. There are many HALS available, but many of them are expensive and/or difficult to make. Thus, it would be desirable to find an effective HALS that can be made by an easier, less expensive method.

SUMMARY OF THE INVENTION

The invention provides a compound with a structure

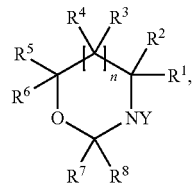

in which n is 0, 1, 2, or 3; $R^1$, $R^2$, $R^7$, and $R^8$ are each independently an alkyl group, including cycloalkyl, an alkyl aryl group, or an aryl group, optionally with heteroatoms, with the proviso that $R^1$ and $R^2$ can together form a cycloalkylene group and, independently, $R^7$ and $R^8$ can together form a cycloalkylene group; Y is an oxygen free radical, a sulfur free radical, $OR^9$ or $SR^9$; $R^3$, $R^4$, $R^5$, $R^6$, and $R^9$ are each independently H or an alkyl group, a cycloalkyl group, an aryl group, or an alkylaryl group, optionally with heteroatoms.

The invention also provides compositions containing the compound of the invention. In certain embodiments, the compositions are coating compositions, particularly topcoat or clearcoat compositions, especially automotive clearcoat compositions. The invention further provides coatings and coated substrates comprising the compound of the invention. The coated substrates especially include the compound of the invention in an outermost coating layer.

The invention further provides a method of making a compound of the invention by reacting a compound

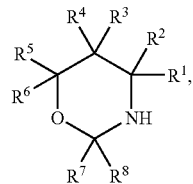

where $R^1$ through $R^8$ are as already defined, with an oxidizing agent, including with a peroxide, perthiol, peracid, permanganate, hydrogen peroxide, ozone, 1,2-dioxiranes of the formula

wherein $R^{10}$ and $R^{11}$ are each independently H, alkyl, carbonyl, or any organic radical including alkyl radicals that may contain a UV active group, and combinations of oxidizing agents, optionally with a further step of reacting the product with a hydrogen free radical or compound with a carbon free radical.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C. "A" and "an" as used herein indicate "at least one" of the item is present; a plurality of such items may be present, when possible. Other than in the working examples provides at the end of the detailed description, all numerical values of parameters (e.g., of quantities or conditions) in this specification, including the appended claims, are to be understood as being modified in all instances by the term "about." "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring such parameters.

The compound has the following structure

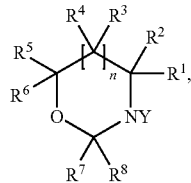

in which n is 0, 1, 2, or 3; $R^1$, $R^2$, $R^7$, and $R^8$ are each independently alkyl group, including cycloalkyl, an alkylaryl group, or an aryl group, optionally with one or more heteroatoms, with the proviso that $R^1$ and $R^2$ can together form a cycloalkylene group and, independently, $R^7$ and $R^8$ can together form a cycloalkylene group; Y is an oxygen free radical, a sulfur free radical, $OR^9$ or $SR^9$; $R^3$, $R^4$, $R^5$, $R^6$, and $R^9$ are each independently H or an alkyl group, a cycloalkyl group, an aryl group, or an alkylaryl group, optionally with one or more heteroatoms. Preferably, $R^1$, $R^2$, $R^7$, and $R^8$ are each independently alkyl group, including cycloalkyl, optionally with one or more heteroatoms, with the proviso that $R^1$ and $R^2$ can together form a cycloalkylene group and, independently, $R^7$ and $R^8$ can together form a cycloalkylene group. Aryl and alkylaryl groups and groups having ether linkages are not preferred. The akyl and cycloalkyl groups may include, for example, oxygen and nitrogen atoms, e.g. as part of ester linkages, urea linkages, and urethane linkages.

In certain preferred embodiments, n is 0 or 1. Also in certain preferred embodiments, at least one of $R^1$ and $R^2$ or $R^7$ and $R^8$ together form a cycloalkylene group. Y is preferably an oxygen free radical or an $OR^9$ group, particularly an oxygen free radical or a hydroxyl group. In certain preferred embodiments, $R^1$ and $R^2$ are methyl and $R^7$ and $R^8$ together form a cycloalkylene group. In particular embodiments, $R^3$, $R^1$, $R^5$, $R^6$, and $R^9$ are each H and n=0.

In general, any of the alkyl groups can be straight or branched, unsubstituted or substituted. When substituted, examples of substituting groups include, but are not limited to hydroxy, acid, epoxide, cyano, isocyanato, activated amide, carbamate, active methylol or methylalkoxy groups, and combinations of these, as well as groups convertible to such groups. When the compounds of the invention are included in thermosettable compositions, for example thermosetting coating compositions, in certain preferred embodiments the compounds have one or more alkyl groups substituted with a group reactive in the thermosetting reaction (or a group convertible to a group reactive in the thermosetting reaction). As a nonlimiting example, a coating composition comprises a compound of the invention that includes at least one group reactive with a film-forming component (e.g., a binder or crosslinker component) of the coating composition. It is often advantageous for the compound of the invention to include at least one functional group that reacts with a material in the composition, whether that composition is a coating, an ink, a plastic, or a fiber, so that the compound of the invention is bound into the composition.

Cycloalkylene groups formed by $R^1$ and $R^2$ or $R^7$ and $R^8$ can be any cycloalkylene group, optionally substituted, and optionally can contain one or more heteroatoms in the ring. Substitutents may, for example, be any of the substituting groups already mentioned. Nonlimiting examples include cyclohexylene, cyclopentylene, and cyclooctylene groups.

Examples of heteroatoms that can be included in the structures described above include, but are not limited to nitrogen, oxygen, and/or sulfur.

The composition can be made by a method comprising condensation reacting a ketone and an aminoalcohol, in which the amine group is a primary amine and the carbon alpha to the amine group is tertiary, to form a first reaction product, reacting the first reaction product with an oxidizing agent to form a second product having an N—Y radical or an N—YH group, and, optionally, reacting the second reaction product having an N—Y radical with free radical source to provide an N—YR$^9$ group.

The ketone may be any ketone; aliphatic ketones are preferred. The ketone and the amine may be selected to provide a compound of the invention that is compatible with the composition in which it is used, and which remains in the composition (that is, for example, one that is not lost from the composition by volatilizing during the useful lifetime of the composition). The ketone has a general structure $R^7C(=O)R^8$. Nonlimiting examples of suitable ketones include cyclohexanone, cyclopentanone, diisobutyl ketone, and other linear ketone having six or more carbon atoms and cyclic ketone having five or more carbon atoms.

The aminoalcohol, in which the amine group is a primary amine and the carbon alpha to the amine group is tertiary. In general, the aminoalcohol has a structure

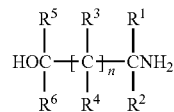

in which $R^1$, $R^2$, $R^3$, $R^4$, $R^5$, $R^6$, and n are as already defined.

Nonlimiting examples of suitable include 2-amino, 2,2 dialkyl alcohols such as 2-amino-2-methyl-1-propanol (AMP), 2-amino-2,2-dimethylethanol, 2-amino-2ethyl, 1-3-propanediol (AEPD), tris(hydroxymethyl)-aminomethane, 1-amino-1-methyl-2-hydroxycycloexane, and 2-amino-2-methyl-1-butanol.

The reaction product of the ketone and aminoalcohol is then oxidized. Nonlimiting examples of suitable oxidizing agents include hydrogen peroxide, peracetic acid, organic peroxides, including dialkyl peroxides, such as di-tert-butyl peroxide, and alkyl hydroperoxides, such as t-butyl hydroperoxide, peroxyesters, such as tert-butyl peroxy 2-ethylhexanoate and tert-butyl peroxy pivalate; peroxy carbonates and peroxydicarbonates, such as tert-butyl peroxy isopropyl carbonate, di-2-ethylhexyl peroxydicarbonate and dicyclohexyl peroxydicarbonate; diacyl peroxides, such as dibenzoyl peroxide and dilauroyl peroxide; ketone peroxides, such as cyclohexanone peroxide and methylisobutyl ketone peroxide; and peroxyketals, such as 1,1-bis(tert-butyl peroxy)-3,5, 5-trimethylcyclohexane and 1,1-bis(tert-butyl peroxy)cyclohexane; permaganates such as potassium permanganate; persulfides (RSSH) such as butyl persulfide; peroxymonosulfates such as potassium peroxymonosulfate; persulfates or persulfoesters such as dibutyl persulfate; peroxyacids, including peracetic acid, perpropionic acid, perbutanoic acid, perbenzoic acid, and substituted perbenzoic acids such as paranitroperbenzoic acid and parachloroperbenzoic acid; ozone; 1,2-dioxiranes of the formula

wherein $R^{10}$ and $R^{11}$ are each independently H, alkyl, carbonyl, or any organic radical including alkyl radicals that may contain a UV active group, such as 3,3-dimethyl-1,2-dioxirane; and combinations of these. A gaseous oxidizer such as ozone can be made in situ by known methods or made in a separate generator and bubbled through the reaction mixture. Typically, peroxyacids such as peracetic acid and perbenzoic acid are preferred because they require no catalyst.

In general, it is preferably to avoid harsh oxidizing conditions; mild oxidizing conditions (<100° C., preferably <50° C., neutral or buffered pH) are preferred to avoid side reactions and degradation of reactants and/or the desired product. The oxidation step may be carried out in the presence of a suitable catalyst. Some oxidants, for example peroxybenzoic acid and peroxyacetic acid, may provide suitable reaction rates without a catalyst; however, including catalysts may be beneficial with other oxidants. Nonlimiting examples of suitable catalysts include tungstate salts such as sodium tungstate, sodium carbonate, heterogeneous layered double hydroxide catalyst, and Mg—Al hydrotalcite chloride. Chromatographic media such as silica gel and alumina may also catalyze the reaction. Combinations of catalysts may be used.

Preferred catalysts include, but are not limited to, sodium tungstate dihydrate or anhydrous, sodium carbonate, heterogeneous layered double hydroxide catalyst, Mg—Al hydrotalcite chloride, and combinations thereof. In one embodiment, the catalyst is sodium tungstate (NaWO$_4$), which may be anhydrous or hydrated. The amount of catalyst can be any amount that catalyzes the reaction. Preferably, the amount of catalyst is from about 0.01 to about 50% by weight of the first reaction product. In other embodiments, the amount of catalyst is from 0.01 to 5% or from 0.01 to 1% by weight of the first reaction product. The reaction can be carried out in a two-phase reaction media. A phase transfer catalyst may be used for reaction in a two-phase reaction media.

After the oxidation step, depending upon the type of oxidizing agent used, Y is an oxygen free radical, sulfur free radical, hydroxyl group, thiol group, or the product may be a mixture of products having a combination of free radical and non-free radical groups. The amounts of structures with radicals and the structures with YH can vary, but after reaction with a radical in the third step described below, the same product would be obtained. It is desirable to carry out the oxidation step with an excess of oxidant, preferably from a 10% to a ten-fold excess of oxidant, to ensure complete oxidation of the amine group.

The product may be used as a hindered amine light stabilizer following the oxidation step, optionally with purification, e.g. by recrystallization, or may be further reacted with a radical in a third step to introduce a bulky group onto the nitroxyl or nitrosulfyl radical, whether or not a hydrogen is present on the group following oxidation. The radical reacted with the product of the oxidation step is a hydrogen or carbon radical.

In one embodiment, the oxidation product is further reacted with an azo compound. Nonlimiting examples of suitable azo compounds include 2,2'-azodi(isobutyronitrile), 2,2'-azodi(2-methylbutyronitrile), azodiisobutyramide, 2,2'-azo-bis(2,4-dimethylvaleronitrile), 2,2'-azobis-4-methoxy-2,4-dimethylvaleronitrile, dimethyl-, diethyl- and dibutyl azo-bis(methylvalerate), 2,2'-azobis-2-cyclopropylpropionitrile, 1,1'-azobiscyclohexane-1-carbonitrile, 2-phenylazo-4-methoxy-2,4-dimethylvaleronitrile, 2,2'-azobis-N,N-dimethylisobutyramidine, 2,2'-azobis[2-(2-imidazolin-2-yl)propane disulfate dehydrate, 2,2'-azobis[N-(2-carboxyethyl)-2-methylpropionamidine]tetrahydrate, 2,2'-azobis[N-(2-carboxyethyl)-2-methylpropionamidine] tetrahydrate, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyxl] propionamide, 2,2'-azobis[2-methyl-N-(2-hydroxyethyl) propionamide], 2,2'-azobis[2-(2-imidazolin-2-yl)propane] dihydrochloride, 2,2'-azobis[2-(2-imidazolin-2-yl)propane], 2,2'-azobis {2-methyl-N-[2-(1-hydroxybutyl)]propionamide}, 1,1'-azobis(1-cyclohexanecarbonitrile, 2,2'-azobis (methyl isobutyrate, and 2,2,-azobis(2-amidinopropane)dihydrochloride Many such compounds are available as VAZO® initiators from DuPont. Examples of the VAZO® initiators include those listed below.

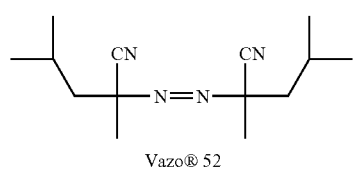

Vazo® 52

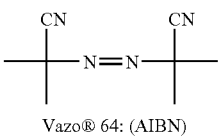

Vazo® 64: (AIBN)

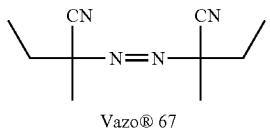

Vazo® 67

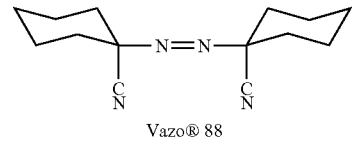

Vazo® 88

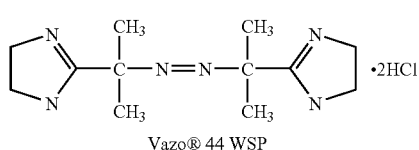

Vazo® 44 WSP

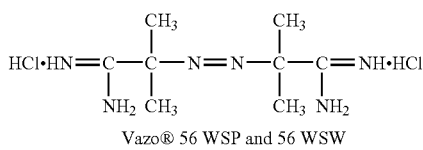

Vazo® 56 WSP and 56 WSW

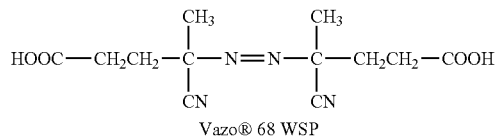

Vazo® 68 WSP

Reaction with an azo nitrile compound produces for example, a compound with an alkylnitrile substituent

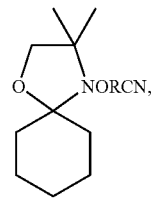

wherein R is an alkylene group.

In another embodiment, the oxidation product is further reacted with a thiol compound, such a octanethiol or dodecanethiol.

In one embodiment, the composition can be made by a method comprising reacting cyclohexanone and 2-amino-2-methyl-1-propanol (AMP) to form a first reaction product, oxidizing the first reaction product to form a second reaction product, and optionally reacting the second reaction product with 2,2'-azobis(2-methylpropionitrile) to form the product compound. The oxidant may be hydrogen peroxide or, preferably, peracetic acid The reaction is detailed below.

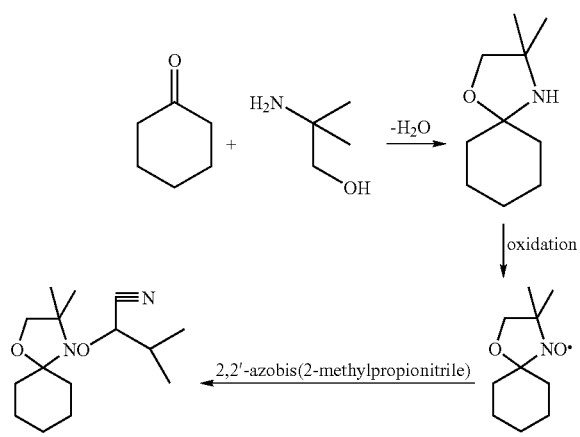

The steps in the reaction can be performed by methods disclosed in the following references:
Monoalkylaminopropanols and butanols and their esters. Hancock, Evelyn M.; Cope, Arthur C.
Journal of the American Chemical Society (1944), 66 1738-47;
Kligel W. et al, Liebigs Annalen der Chemie, 1982, pg 1712;
U.S. Pat. No. 5,001,233;
U.S. Pat. No. 6,455,735;
Journal f. prakt. Chemie, Band 327, 1011 (1985);
Razantsev, Khimiya *Free Iminoxyl Radicals*, Moscow, 1970;
U.S. Pat. No. 6,342,647; and
Surface-mediated reactions. 9. Selective oxidation of primary and secondary amines to hydroxylamines. Fields, John D.; Kropp, Paul J. Department of Chemistry, University of North Carolina, Chapel Hill, N.C., USA. Journal of Organic Chemistry (2000), 65(19).

The compound of the present invention can be used as a hindered amine light stabilizer (HALS) in compositions. It can be used in any composition in which HALS are used. The amount of the composition of the present invention in a composition can be any amount to achieve a desired level of stabilization. In certain embodiments, the composition is incorporated in a coating composition, especially in a coating composition for forming topcoat and clearcoat layers. Although topcoats are the most typical coating layer for HALS stabilization, these HALS stabilizers can also be used in primer or electrocoat layers. This HALS can also be used as a stabilizer in plastics polymers such as polyethylene or plastic composites. It can also be used to stabilize synthetic fibers, which include fiber polymers. Also, it can be used as a coating for natural fibers. The coating composition can contain any material that can be included in a coating composition. The coating composition may be a solventborne, waterborne, powder, powder slurry, or radiation-curable coating composition.

The HALS compound of the present invention is preferably present in a topcoat, basecoat, or clearcoat coating composition from about 0.1 to about 5% by weight of the binder (also known as "fixed vehicle," referring to organic film-forming materials) in the coating composition. In certain embodiments, the coating composition is an automotive coating composition. The automotive coating composition is applied to an automotive substrate, e.g. a vehicle body or body element or automotive part. The applied coating layer can be cured to provide a cured coating layer on the automotive substrate. The HALS compound of the invention may be present in more than one layer on a substrate. For example, the HALS compound may be in both the basecoat and clearcoat layers of a composite basecoat-clearcoat coating on a substrate, or in only the clearcoat layer or only the basecoat layer. The basecoat and clearcoat compositions may be any of a number of types well-known in the art. Polymers known in the art to be useful in such compositions include acrylics, vinyls, polyurethanes, polycarbonates, polyesters, alkyds, and polysiloxanes, including combinations and graft copolymers of these. Preferred polymers include acrylics and polyurethanes. While the polymers may be thermoplastic, thermoset or crosslinkable polymers comprising one or more types of crosslinkable functional groups are preferred. Such groups include, for example, hydroxy, carbamate, urea, isocyanate, amine, oxirane, acrylate, vinyl, silane, and acetoacetate groups. These groups may be masked or blocked in such a way so that they are unblocked and available for the crosslinking reaction under the desired curing conditions, generally elevated temperatures. Preferred crosslinkable functional groups include hydroxy and carbamate groups. Clearcoat and basecoat compositions are preferably thermosetting and include one or more suitable crosslinkers. Useful crosslinkers include, without limitation, materials having active methylol or methylalkoxy groups, such as aminoplast crosslinking agents or phenol/formaldehyde adducts; curing agents that have isocyanate groups, particularly blocked isocyanate curing agents; curing agents that have acid groups, silane groups, and anhydride groups; and mixtures thereof. Examples of useful curing agent compounds include, without limitation, melamine formaldehyde crosslinkers (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurates, biurets, allophanates, or other oligomers of these, which may be blocked, for example, with alcohols or oximes), urea resins (e.g., methylol ureas such as urea formaldehyde resin, alkoxy ureas such as butylated urea formaldehyde resin), polyanhydrides (e.g., polysuccinic anhydride), and silane-functional crosslinkers (e.g., trimethoxy siloxane). Another suitable crosslinking agent is tris(alkoxy carbonylamino)triazine. The curing agent may be combinations of these, particularly combinations that include aminoplast crosslinking agents with, e.g., tris(alkoxy carbonylamino) triazine and/or blocked polyisocyanates. The clearcoat and/or basecoat composition is preferably a solventborne composition, an aqueous composition, a powder coating composition, or a powder slurry clearcoat composition.

In a composition including a HALS according to invention, it may be beneficial to further include one or more of ultraviolet light absorbers [UV absorbers or UVAs) and antioxidants. Durability can be enhanced by preventing degradation by more than one pathway. Nonlimiting examples of UV absorbers include benzotriazoles, hydroxyphenyltriazoles, and oxanilines, as well as nanoparticles such as zinc oxide, titanium dioxide, and zirconium oxide nanoparticles. Nonlimiting examples of antioxidants include sacrificial antioxidants such as phosphates and hindered phenolic compounds. It is beneficial for coating compositions, including basecoat and clearcoat compositions, to include a compound according to the invention as well as at least one member selected from the group consisting of UV absorbers, antioxidants, and combinations thereof.

Coating compositions can be coated on the article by any of a number of techniques well-known in the art. These include, for example, spray coating, dip coating, roll coating, curtain coating, and the like. For automotive body panels, spray coating is preferred.

While the HALS compound of the invention may be included in any coating composition, it finds particular utility in those thermoset coating compositions in which cure may be hindered by the presence of basic compounds, as the present compounds are neutral.

SPECIFIC EMBODIMENTS OF THE INVENTION

The invention is further described in the following examples. The examples are merely illustrative and do not in any way limit the scope of the invention as described and claimed. All parts are by weight unless indicated to be otherwise.

EXAMPLE 1

Preparation of Inventive Composition

Step 1: Reaction of cyclohexanone with 2-amino-2-methyl-1-propanol to form 3,3-dimethyl-1-oxa-4-azaspiro[4.5]decane.

A mixture of 150 parts by weight of cyclohexanone, 143.3 parts by weight of 2-amino-2-methyl-1-propanol and 100 parts by weight of toluene was heated to reflux under inert atmosphere in a reactor equipped to remove the water by-product. Once at reflux, the inert atmosphere was turned off and the system kept at reflux until the reaction was complete. The solvent was then removed by vacuum distillation.

Step 2: Oxidation of Step 1 material to 4-hydroxy-3,3-dimethyl-1-Oxa-4-azaspiro[4.5]decane While under an inert atmosphere, 65.1 parts by weight of a 31% by weight solution of hydrogen peroxide in water was slowly added to a mixture of 50 parts by weight of the above material from Step 1, 2.775 parts by weight sodium tungstate, 38 parts by weight of deionized water, and 65.1 parts by weight of methanol. During the addition of the hydrogen peroxide solution, the reaction mixture was allowed to exotherm to 57° C. Once the reaction was over, the product was isolated by crystallization to give a fine white powder.

EXAMPLE 2

Preparation of Inventive Composition

Step 1: Reaction of cyclohexanone with 2-amino-2-methyl-1-propanol to form 3,3-dimethyl-1-oxa-4-azaspiro[4.5]decane.

This reaction was carried out in the same way as in Example 1.

Step 2: Oxidation of 3,3-dimethyl-1-oxa-4-azaspiro[4.5]decane to 3,3-dimethyl-1-oxa-4-azaspiro[4.5]dec-4-yloxy.

The reaction procedure from Step 2A was repeated except that the reaction temperature during the addition of the hydrogen peroxide solution was not allowed to go above 33° C. Once all of the hydrogen peroxide solution was added, the reaction mixture was allowed to exotherm to 65° C. Once the reaction was over, the product was isolated by crystallization to give fine orange needles.

Step 3: Reaction of 3,3-dimethyl-1-oxa-4-azaspiro[4.5]dec-4-yloxy with 2,2'-azobis(2-methylbutanenitrile)

A mixture of 10 parts by weight of the product from Step 2B, 8.5 parts by weight of 2,2'-azobis(2-methylbutanenitrile), and 23.4 parts by weight of toluene were heated to 84° C. under an inert atmosphere. The mixture was held at 80 to 84° C. for four hours. Then 6.4 parts by weight of 2,2'-azobis(2-methylbutanenitrile) was added and the reaction mixture held at 84° C. for one hour. The final product was a pale yellow clear solution.

EXAMPLE 3

Preparation of Inventive Composition

Step 1: Preparing 3,3-dimethyl-1-oxa-4-azaspiro[4.5]decane

A mixture of 400 parts by weight of cyclohexanone, 394.9 parts by weight of 95% by weight pure 2-amino-2-methyl-1-propanol, and 572 parts by weight of toluene was heated under an inert atmosphere to reflux in a reaction flask equipped with a trap designed to remove water and return solvent to the mixture. Once at reflux, the reaction was allowed to continue until the theoretical amount of water was removed. The reaction mixture was then purified by vacuum distillation to obtain a colorless liquid.

Step 2: Making 3,3-dimethyl-1-Oxa-4-azaspiro[4.5]dec-4-yloxy

A mixture of 25 parts by weight of 3,3-dimethyl-1-oxa-4-azaspiro[4.5]decane from Step 1, 100 parts by weight of methylene chloride, and 120 parts by weight of deionized water was stirred under an inert atmosphere in a water-cooled reactor that is equipped with a gas release system. While keeping the pH of the reaction mixture between 6.9 and 8.0, 56.4 parts by weight of a mixture of 32% by weight peracetic acid in acetic acid/water was added. When required, the pH of the reaction mixture was adjusted by addition of a saturated solution of $K_2CO_3$ in water. When the reaction was complete, the pH of the mixture was raised above 9.0 by addition of the aqueous solution of $K_2CO_3$. The resulting orange solution was then separated from the water layer and solvent removed by mild vacuum distillation to obtain the stable radical in the form of orange crystals. (If desired, the crystals could be further purified by vacuum sublimation or re-crystallization from methanol.)

Step 3: Reaction of 3,3-dimethyl-1-Oxa-4-azaspiro[4.5]dec-4-yloxy with a chain transfer agent (octane thiol).

A mixture was prepared with 1 part by weight of the orange 3,3-dimethyl-1-Oxa-4-azaspiro[4.5]dec-4-yloxy from Step 2 in 2 parts by weight of methanol, and to this mixture was added 0.8 parts by weight of octanethiol. A mildly exothermic reaction occurred with the total disappearance of color.

EXAMPLE 4

Preparation of Inventive Composition

Steps 1 and 2 were carried out as in Example 3 to make 3,3-dimethyl-1-Oxa-4-azaspiro[4.5]dec-4-yloxy Step 3: Reaction of 3,3-dimethyl-1-Oxa-4-azaspiro[4.5]dec-4-yloxy with a free radical generator (2,2'-Dimethyl-2,2'-azodibutyronitrile)

A mixture of 50 parts by weight of orange 3,3-dimethyl-1-Oxa-4-azaspiro[4.5]dec-4-yloxy in 200 parts by weight of xylene was heated under an inert atmosphere to 80° C. Then 283.2 parts by weight of 2,2'-Dimethyl-2,2'-azodibutyronitrile was slowly added. At the end of the reaction, the bright orange solution turned a faint yellow in color which had less than 1% starting nitroxide (determined by gas chromatography).

The product can be used as a xylene solution, or neat by removal of solvent under mild vacuum distillation.

EXAMPLE 5

Preparation of Composition of the Invention

Charge 3 moles cyclohexanone, 3 moles AMP 95 (2-amino-2-methyl-1-propanol, 95% pure) and 200 g toluene to a round bottom flask with agitator. Heat under a nitrogen blanket to reflux—approximately 120 C. When reflux is attained, turn off nitrogen and hold 30 minutes.

After 30 minutes, cool batch slightly, fit flask with Dean-Starke trap, return batch to reflux and remove 3 moles water to the trap. Temperature will increase as reaction ensues and water is removed. Cool reaction mixture when theoretical quantity of water has been removed.

Vacuum distill toluene and unreacted starting materials from product. Hold temperature at 70° C. and apply 20 inch vacuum. Follow distillation by gas chromatography until all unreacted materials are removed from batch.

To 288 g of reaction mixture, charge 16 g sodium tungstate ($NaWO_4.H_2O$), 200 g DI water and 375 g methanol. Place flask in ice bath. Charge 375 g of 31% hydrogen peroxide solution dropwise to mixture, maintaining a reaction temperature below 55 C. Allow mixture to cool to room temperature and sit for 12 hours.

To purify, place reaction mixture in freezer (approximately 4 C) until crystals form. Filter out crystals, dissolve a second time in methanol, and allow to recrystallize in freezer. Re-filter and rinse with cold methanol. Air dry the product white crystals.

EXAMPLE 6

Coating Compositions and Coatings of the Invention

The composition of Example 2 was evaluated against commercially available hindered amine stabilizers in a modified version of a commercially available clearcoat coating composition, R10CGO62 (available from BASF Corporation). In the modified version, the clearcoat composition was prepared without a hindered amine stabilizer (HALS), but otherwise the same as the commercial product. The HALS shown in the Table below were tested at a weight percent of 1.5% on fixed vehicle in the modified version of R10CGO62. The result that best demonstrates the Example 2 compound's effectiveness as a HALS is the gloss retention and cracking after 2500 hrs of QUV. The crockmeter and Jacksonville exposure results show the effect on cure of the film. The basic HALS (Tinuvin 292) had poorer results due to negative effect on cure.

The Crockmeter (Atlas Instruments) method tested the panels by rubbing with 2 micron abrasive paper (281Q wetodry from 3M Corp.). After ten double rubs the 20 degree gloss retention values were obtained. Jacksonville exposure testing is rated on a scale from 1 (no etching) to 10 (complete failure).

It should be appreciated that the present invention is not limited to the specific embodiments described above, but includes variations, modifications and equivalent embodiments defined by the following claims.

What is claimed is:

1. A compound

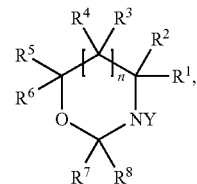

wherein n is 0, 1, 2, or 3; $R^1$, $R^2$, $R^7$, and $R^8$ are each independently alkyl, cycloalkyl, alkylaryl, or aryl, optionally with one or more heteroatoms, with the proviso that $R^1$ and $R^2$ can together form a cycloalkyl group and, independently, $R^7$ and $R^8$ can together form a cycloalkyl group; Y is a sulfur free radical, $OR^9$ or $SR^9$; $R^3$, $R^4$, $R^5$, and $R^6$ are each independently H, alkyl, cycloalkyl, aryl, or alkylaryl, optionally with one or more heteroatoms; and $R^9$ is alkyl, cycloalkyl, aryl, or alkylaryl, with one or more heteroatoms, wherein the one or more heteroatoms comprise a nitrogen or sulfur atom.

2. The compound of claim 1, wherein Y is $OR^9$ and $R^9$ is a fragment of an azo compound.

3. The composition of claim 1, wherein $R^7$ and $R^8$ together form a cyclohexyl group.

4. The compound of claim 1, wherein $R^1$, $R^2$, $R^7$, and $R^8$ are each independently alkyl or cycloalkyl with the proviso that $R^1$ $R^2$ can together form a cyclohexyl group and, independently, $R^7$ and $R^8$ can together form a cyclohexyl group.

5. The compound of claim 1, wherein n is 0 or 1.

TABLE

| | HALS | | | | | |
|---|---|---|---|---|---|---|
| TEST | Tinuvin 123 | Tinuvin 292 | Example 2 | Tinuvin 123 | Sanduvor 3068 | No HALS |
| Crockmeter % gloss retention | 96% | 73% | 97% | 96% | 97% | 97% |
| Jacksonville Exposure | 7 | 10 | 5 | — | — | — |
| QUV-2500 hrs, % gloss retention | 97% | 95% | 98% | 96% | 97% | 70% |
| QUV-2500 hrs, distortion | slight cracking | slight cracking | slight cracking | slight cracking | moderate cracking | severe cracking |

6. The compound of claim 1, wherein $R^1$ and $R^2$ are methyl, $R^5$ and $R^6$ are each H, and n=0.

7. A compound

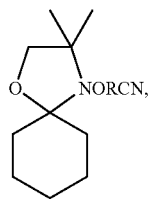

wherein R is an alkylene group.

8. A compound

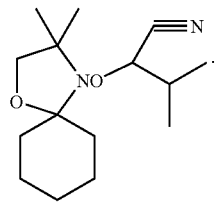

9. The compound of claim 1, in which at least one of $R^1$, $R^2$, $R^3$, $R^4$, $R^5$, $R^6$, $R^7$, $R^8$ and $R^9$ is an alkyl comprising a group selected from hydroxy, acid, epoxide, cyano, isocyanato, activated amide, carbamate, active methylol, and methylalkoxy groups and combinations thereof.

10. The compound of claim 1, in which none of $R^1$, $R^2$, $R^3$, $R^4$, $R^5$, $R^6$, $R^7$, and $R^8$ is a substituted alkyl.

* * * * *

UNITED STATES PATENT AND TRADEMARK OFFICE
CERTIFICATE OF CORRECTION

| | | |
|---|---|---|
| PATENT NO. | : 7,538,130 B2 | Page 1 of 1 |
| APPLICATION NO. | : 11/234898 | |
| DATED | : May 26, 2009 | |
| INVENTOR(S) | : Campbell et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 443 days Delete the phrase "by 443 days" and insert -- by 685 days --

Signed and Sealed this

Fourth Day of May, 2010

David J. Kappos
*Director of the United States Patent and Trademark Office*